United States Patent
Danielsen

(10) Patent No.: US 7,546,450 B2
(45) Date of Patent: Jun. 9, 2009

(54) METHOD AND APPARATUS FOR OPERATING SYSTEM DEPLOYMENT

(75) Inventor: Jay R. Danielsen, Allen Park, MI (US)

(73) Assignee: Sun Microsystems, Inc., Santa Clara, CA (US)

( * ) Notice: Subject to any disclaimer, the term of this patent is extended or adjusted under 35 U.S.C. 154(b) by 396 days.

(21) Appl. No.: 11/369,335

(22) Filed: Mar. 7, 2006

(65) Prior Publication Data

US 2007/0214348 A1    Sep. 13, 2007

(51) Int. Cl.
G06F 15/177 (2006.01)
G06F 9/24 (2006.01)
G06F 9/00 (2006.01)

(52) U.S. Cl. .............................. 713/2; 713/1; 713/100; 709/222

(58) Field of Classification Search ................ 713/2; 709/222
See application file for complete search history.

(56) References Cited

U.S. PATENT DOCUMENTS 6,567,774 B1 * 5/2003 Lee et al. ................. 703/23
6,810,478 B1 * 10/2004 Anand et al. ............... 713/2
7,243,224 B2 * 7/2007 Nair et al. .................. 713/2
2004/0163008 A1 * 8/2004 Kim ........................... 714/4
2006/0107030 A1 * 5/2006 Biondi et al. ............... 713/2

OTHER PUBLICATIONS

Nielsen, M.; "How to Use a Ramdisk for Linux"; LinuxFocus.org; Nov. 1999; 4 pages.

* cited by examiner

Primary Examiner—Thomas Lee
Assistant Examiner—Stefan Stoynov
(74) Attorney, Agent, or Firm—Osha • Liang LLP

(57) ABSTRACT

In general, in one aspect, the invention relates to a method for deploying an operating system on a client. The method includes downloading a boot configuration file, downloading a boot kernel and boot loader specified in the boot configuration file, booting the boot kernel on the client, executing the boot loader, by the kernel, to download of a ramdisk image, and mounting the ramdisk image in memory on the client, where the ramdisk image comprises the operating system.

17 Claims, 4 Drawing Sheets

METHOD AND APPARATUS FOR OPERATING SYSTEM DEPLOYMENT

BACKGROUND

Whenever a computer is to be deployed on a network, an operating system must be loaded on the network. Once the operating system has been loaded onto the computer, various parameters of the operating system (e.g., network support, etc.) are configured to enable the computer to be deployed onto the network. Once all of the aforementioned tasks have been completed, the computer is deployed onto the network (i.e., a user can use this computer on the network).

The aforementioned approach works well when networks include a small number of computers. However, as networks expand, it is no longer efficient to have an administrator manually perform the aforementioned tasks. As a result, the concept of remote network booting (also known as a diskless boot) has been developed. In general, the idea behind remote network booting is to allow a large number of computers (e.g., greater than 50) to be booted automatically using a common operating system image (i.e., an operating system configured to enable the computer to work on the network). Such diskless boot approaches require maintenance of a set of identity files (for example, "/etc", "/var", "swap", etc.) on a server.

The following briefly describes a diskless boot. Initially, a boot program is loaded onto the client (i.e., a computer upon which the operating system image is to be deployed). Typically, the boot programs reside in the client's Basic Input/Output System (BIOS) or in a boot Read Only Memory (ROM) located on a network card connected to the client. Upon execution, the boot program downloads a kernel from a Trivial File Transfer Protocol (TFTP) server. The kernel is typically downloaded using either an intermediate loader, such as a pre-boot execution environment (PXE) loader or directly from the TFTP server. Once the kernel has been downloaded, the kernel uses Dynamic Host Configuration Protocol (DHCP) or Bootstrap Protocol (BOOTP) to acquire configuration information. Upon receiving the configuration information, the client proceeds to boot the root filesystem (exported from the NFS server) and start operation of the kernel. Using the above steps (and associated technology), the above diskless boot allows a client to boot a kernel that is a maximum of 32 megabytes in size in its compressed state.

SUMMARY

In general, in one aspect, the invention relates to a method for deploying an operating system on a client, comprising downloading a boot configuration file, downloading a boot kernel and boot loader specified in the boot configuration file, booting the boot kernel on the client, executing the boot loader, by the kernel, to download of a ramdisk image, and mounting the ramdisk image in memory on the client, wherein the ramdisk image comprises the operating system.

In general, in one aspect, the invention relates to a system for deploying an operating system on a plurality of clients, comprising a plurality of servers, wherein each of the plurality of servers comprises a plurality of boot configuration files, wherein each of the plurality of boot configuration files is associated with one of the plurality of clients, and a ramdisk image, the plurality of clients, wherein each of the plurality of clients comprises a memory, wherein each of the plurality of clients is configured to: search for the one of the plurality of boot configuration files associated with the client, download the one of the plurality of boot configuration files associated with the client, download the boot kernel and boot loader specified by the one of the plurality of boot configuration files associated with the client, boot the boot kernel on the client, execute the boot loader, by the kernel, to download of a ramdisk image, and mount the ramdisk image in memory on the client, wherein the ramdisk image comprises the operating system.

In general, in one aspect, the invention relates to a computer readable medium containing instructions for deploying an operating system on a client, the instructions comprising functionality to download a boot configuration file, download a boot kernel and boot loader specified in the boot configuration file, boot the boot kernel on the client, execute the boot loader, by the kernel, to download of a ramdisk image, and mount the ramdisk image in memory on the client, wherein the ramdisk image comprises the operating system.

Other aspects of the invention will be apparent from the following description and the appended claims.

DETAILED DESCRIPTION

Figure 1:
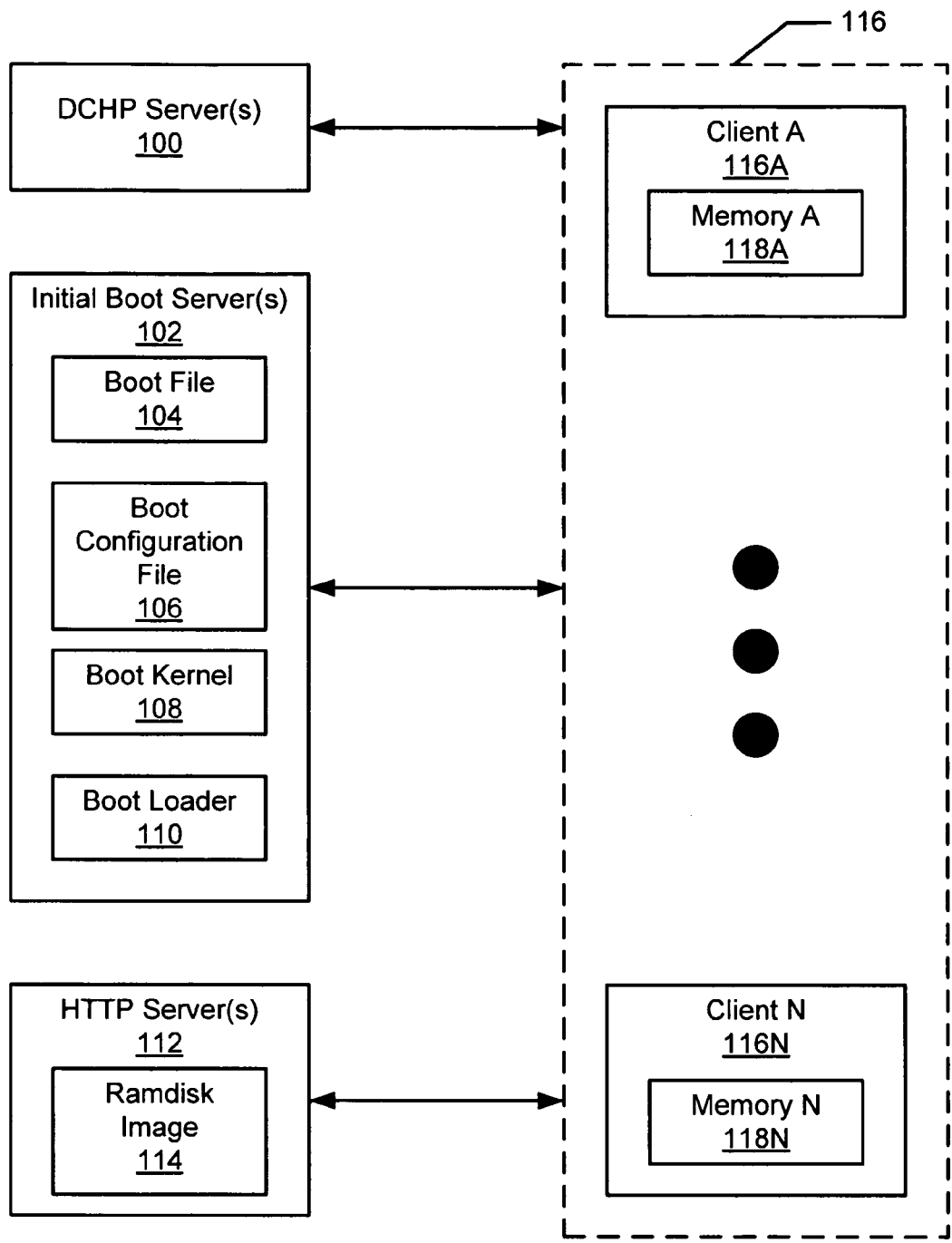
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and apparatus for automatically deploying an operating system on a large number of clients. More specifically, embodiments of the invention relate to a method and apparatus for downloading a full operating system (e.g., an operating system greater than 1 gigabyte in size) into the memory of each of the large number of clients.

Embodiments enable the full operating system to be downloaded into the memory of each of the large number of clients using a two-stage boot process. In the first stage, a boot kernel and a boot loader are downloaded onto each of the large number of clients. In the second stage, the kernel executes the boot loader thereby initiating the downloading of the full operating system onto each of a large number of clients. Once the full operating system has been downloaded, it is mounted into the memory of the client.

FIG. 1 shows a system in accordance with one embodiment of the invention. As shown in FIG. 1, the system includes one or more Dynamic Host Protocol (DHCP) servers (100), one or more initial boot servers (102) and one or more Hypertext Transfer Protocol (HTTP) servers (112). One skilled in the art will appreciate that while only a few types of servers using various protocols are listed above and included in FIG. 1, the system supported by the invention for delivery of the operating system may use any server and practical network protocol known to those skilled in the art, including DHCP, TFTP, HTTP, Secure Shell (SSH) protocol, Secure Copy (SCP) protocol, etc.

Each of the aforementioned servers is operatively connected to one or more clients (116) (e.g., client A (116A) and client N (116N)). In one or more embodiments of the invention, the clients (116) are part of a grid computing system.

Further, each of the initial boot servers (102) includes a boot file (104), a boot configuration file (106), a boot kernel (108), and a boot loader (110). The initial boot servers (102) typically use Trivial File Transfer Protocol (TFTP) to transfer the aforementioned files to the clients (116). Finally, each of the HTTP servers (112) includes a ramdisk image (114) (discussed in FIG. 2). The initial boot servers (102) typically use HTTP to transfer the ramdisk image to the clients (116). Each of the aforementioned servers and files is discussed below.

In one or more embodiments of the invention, each of the DHCP servers (100) is configured to receive requests from the clients (116) for various network boot parameters. The network boot parameters may include, but are not limited to, an Internet Protocol (IP) address for the client (116), a name for a boot file (104) (described below) and the server IP address for the server containing the boot file (104). Typically, the server containing the boot file corresponds to one of the initial boot servers (102).

In one or more embodiments of the invention, there is a single boot file (104) for all clients (116) in the system (i.e., a grid). In one embodiment of the invention, the boot file (104) specifies the boot configuration file (106) associated with the client (116). In one or more embodiments of the invention there is a single boot configuration file (106) for all clients (116) in the system (116). Alternatively, there may be more than one boot configuration file (106). If there is more than one boot configuration file (106) in the system, then the boot file (104) may include functionality and/or information to allow the client (116) to determine which of the boot configuration files (106) to obtain.

In one or more embodiments of the invention, the boot configuration file (106) defines at least the following parameters: (i) a boot kernel (108) to be downloaded and booted by the client (116), (ii) a boot loader (110) to be downloaded and executed by the boot kernel (116), (iii) a location of a ramdisk image (114) (i.e., the location in the network of the ramdisk), (iv) configuration information specifying that the boot kernel (108) and the boot loader (110) to be booted into memory (116A, 118A) of the client (116); and (v) additional configuration information. The aforementioned components specified in the boot configuration file are described below.

In one or more embodiments of the invention, the boot kernel (108) corresponds to a kernel that supports access to memory beyond the four gigabyte range. Accordingly, the delivery of both 32-bit and 64-bit operating system images are supported by the invention. In one or more embodiments of the invention, the boot loader (110) includes functionality to configure the client (116) to download the ramdisk image (114) and to mount the ramdisk image (114) into the memory (116A, 118A) of the client (116).

More specifically, in one or more embodiments of the invention, the boot loader (110) includes at least functionality to: (i) mount /proc (i.e., mount a special file system that allows low level access to the boot kernel); (ii) start network services on the client (116), where the network services include configuring the client (116) to act as a DHCP client; (iii) create a ramdisk (i.e., allocate a portion of memory in the client that will be used to store the ramdisk image (114); (iv) download the ramdisk image (114) from an HTTP server (e.g., 112); (v) uncompress the ramdisk image (114) if the ramdisk image is compressed; (vi) update rc.sysinit script (i.e., a system initialization script) to permit a loopback device (i.e., memory) to operate as a root file system; (vii) mount the ramdisk image (114) using, for example, a pivot_root command (i.e., a command that makes the root of the ramdisk image (114) the root of the filesystem on the client). One skilled in the art will appreciate that the features and commands possible for the boot leader (110) described above are meant to be illustrative of the types of commands and functionality possible and should not limit the invention to any particular flavor or type of operating system.

Returning to the discussion of the boot configuration file (106), in one or more embodiments of the invention, the location of the ramdisk image (114) corresponds to a Universal Resource Locator (URL) of a HTTP server (112) (or servers including, among other functionality, the functionality of the HTTP servers (112)) containing the ramdisk image (114). If multiple HTTP servers (112) (or servers including, among other functionality, the functionality of the HTTP servers (112)) exist in the system containing the ramdisk image (114), then the boot configuration files (106) are created such that the location of the ramdisk image (114) specified in each of the boot configuration files (106) is selected from one of the aforementioned HTTP servers (or servers including, among other functionality, the functionality of the HTTP servers (112)).

A technique to accomplish such selection may be as simple as using a modulo [# of servers] algorithm, which results in evenly distributing the boot load across the servers that provide the ramdisk image. For example, if the ramdisk image (114) is located on two HTTP servers (112) (or servers including, among other functionality, the functionality of the HTTP servers (112)), then the boot configuration files (106) specify the IP address of one of the aforementioned servers. In one or more embodiments of the invention, the boot configuration files are created such that an approximately even number of clients (116) download the ramdisk image (114) from each of the HTTP servers (or servers including, among other functionality, the functionality of the HTTP servers (112)) containing the ramdisk image (114). Thus, if three HTTP servers (or servers including, among other functionality, the functionality of the HTTP servers (112)) exist that contain the ramdisk image (114), then the boot configuration files (106) would be created such that approximately one-third of the boot configuration files (106) specify the first HTTP server (or a server including, among other functionality, the functionality of the HTTP server (112)), approximately one-third of the boot configuration files (106) specify a second HTTP server (or a server including, among other functionality, the functionality of the HTTP server (112)), and approximately one-third of the boot configuration files (106) specify the third HTTP server (or a server including, among other functionality, the functionality of the HTTP server (112)). Those skilled in the art will appreciate that the invention may be modified to use other load balancing techniques.

Returning to the discussion of the boot configuration file (106), in one or more embodiments of the invention, the additional configuration information specifies the amount of memory (118A, 118N) in the client that should be allocated to store and execute the ramdisk image (114). In one or more embodiments of the invention, the allocated memory (118A, 118N) should be large enough to include both the compressed ramdisk image (assuming that it was downloaded in a compressed form) and the uncompressed ramdisk image.

Those skilled in the art will appreciate that while FIG. 1 shows that the initial boot servers (102) and the HTTP servers (112) as separate servers, the contents and functionality of the aforementioned servers may be combined into a set of single servers capable of acting as both initial boot servers and HTTP servers.

Continuing with FIG. 1, each of the clients (116) includes functionality to send requests to the DHCP servers (100) to obtain network parameters in accordance with one or more embodiments of the invention. Further, the clients (116) also include functionality to execute the boot file (104) and download the boot kernel (108) and the boot loader (110). The aforementioned functionality may be obtained from a boot program (now shown) present in the BIOS of each client (116). Alternatively, the boot program (not shown) may be obtained from a network card (not shown) operatively connected to the client (116).

Figure 2:
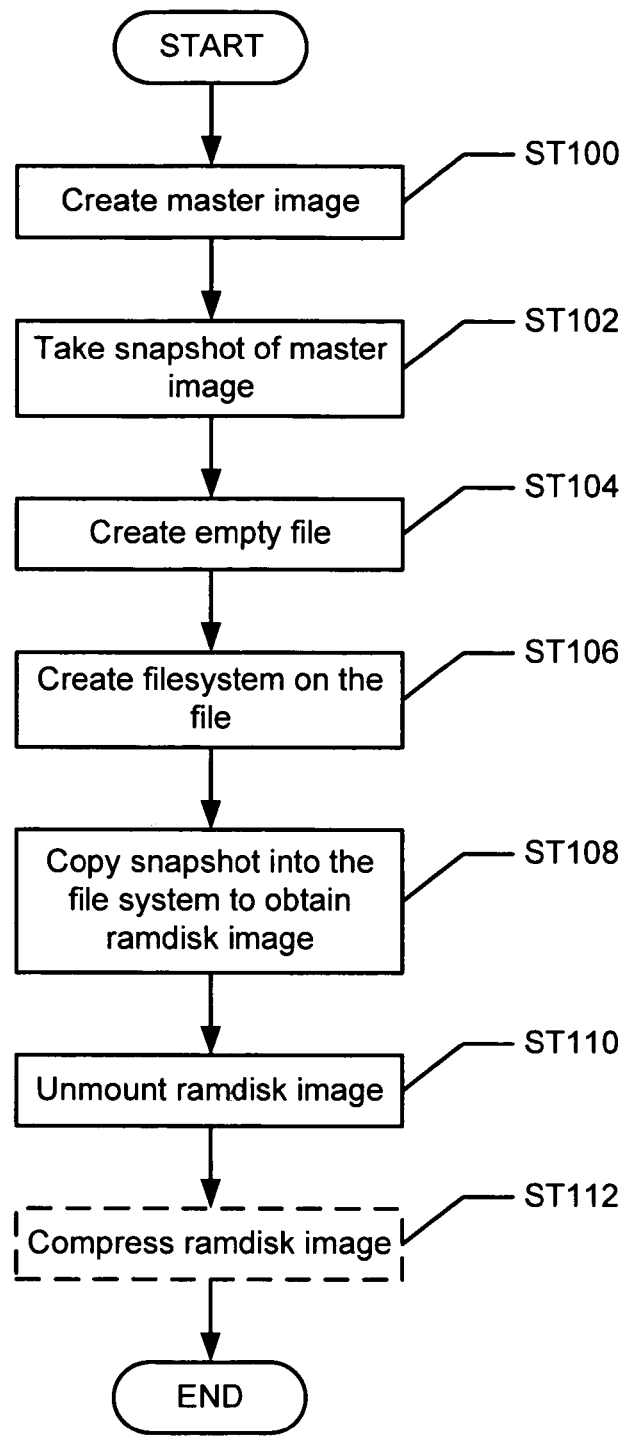
FIGS. 2 and 3 show flowcharts in accordance with one or more embodiments of the invention.

FIG. 2 shows a flowchart in accordance with one or more embodiments of the invention. More specifically, FIG. 2 shows a method of creating a ramdisk image in accordance with one embodiment of the invention. Initially, a master image is created (ST100). In one or more embodiments of the invention, the master image corresponds to the operating system image that is to be deployed to the clients. In one or more embodiments of the invention, the master image includes a minimal operating system installation plus additional software packages that are required to enable the client to execute at least one user application (i.e., a software application that a user executes on the client after the ramdisk image has been deployed to the client).

In one or more embodiments of the invention, the master image may include the following components: (i) a minimal operating system installation; (ii) a set of commonly used software utilities (e.g., software utilities with similar functionality to those present in "busybox" and/or "busybox-anaconda" packages); (iii) support for a huge memory kernel (i.e., support to enable the use of memory addresses beyond the 4 gigabyte memory range); and (iv) sufficient software for networking and/or serial console configuration.

Returning to FIG. 2, once the master image has been installed and configured, a snapshot of the master image is taken (ST102). In one or more embodiments of the invention, the snapshot is taken using a "rsync" command. The "rsync" command copies the entire operating system, excluding dynamically created fields from the /sys and /proc partitions.

Subsequently, an empty file is created (ST104), which is large enough to contain a copy of the operating system image plus additional space for temporary (/var) logs. A filesystem is subsequently created on the empty file (ST106). In one or more embodiments of the invention, the filesystem is a second extensible filesystem (ext2) image (i.e., a filesystem for the Linux kernel) or a UNIX file system (ufs) image (i.e., a filesystem for the Solaris kernel) and is created using a loopback filesystem. In one or more embodiments of the invention, the loopback filesystem associates a file on another filesystem as a mountable device on a current file system.

Once the filesystem is created on the file, the snapshot is copied onto the filesystem to obtain a ramdisk image (ST108). ST108 also includes mounting the snapshot onto the filesystem (i.e., the filesystem created in ST106). The ramdisk image is then unmounted (ST110) and, optionally, compressed. In one or more embodiments of the invention, the compressed ramdisk image is approximately 250 megabytes, while the uncompressed ramdisk image is approximately 1 gigabyte.

Figure 3:
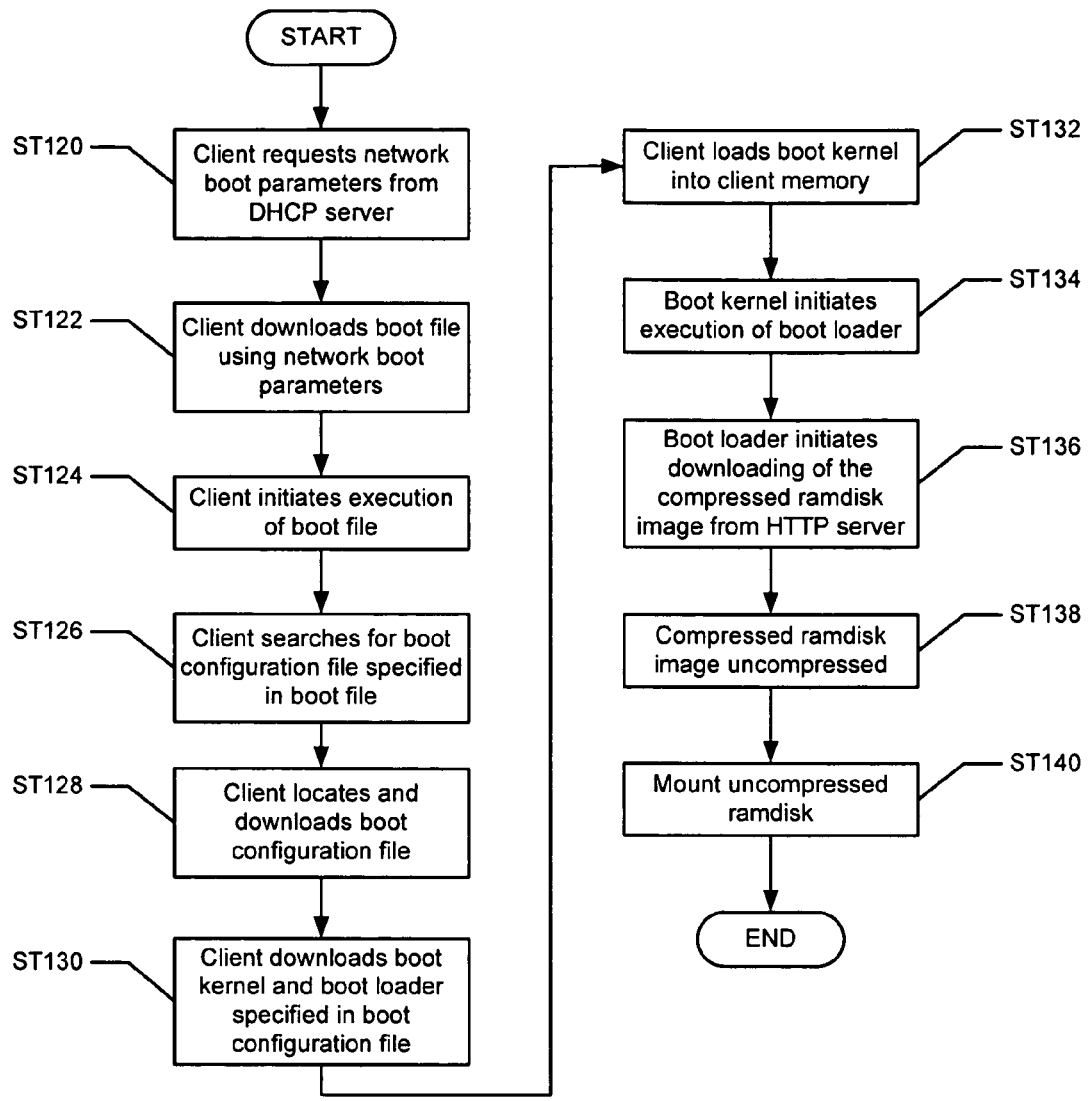

FIG. 3 shows a flowchart in accordance with one or more embodiments of the invention. More specifically, FIG. 3 shows a method for deploying a ramdisk on a large number of clients in accordance with one or more embodiments of the invention.

Initially, the client requests network boot parameters from a DHCP server (ST120). Upon receiving the network boot parameters, the client downloads the boot file using the network boot parameters (ST122). Once the boot file has been downloaded, the client initiates execution of the boot file (ST124). In one or more embodiments of the invention, execution of the boot file includes either: (i) obtaining the name of the boot configuration file associated with the client or (ii) determining the name of the boot configuration file associated with the client.

Once the name of the boot configuration file associated with the client is obtained/determined, the client searches for the aforementioned boot configuration file (ST126). The aforementioned searching typically includes searching by sending queries to one or more servers in the system. The client subsequently locates and downloads the aforementioned boot configuration file (ST128). After the boot configuration file has been downloaded, the client downloads the boot kernel and the boot loader specified in the boot configuration file (ST130). In one or more embodiments of the invention, the combined size of the boot kernel and the boot loader is less than or equal to 32 megabytes.

Continuing with the discussion of FIG. 3, the client subsequently loads the boot kernel into its memory (ST132). In one or more embodiments of the invention, when the boot kernel is loaded into memory, the root device for the client operating system is declared to be of type ramdisk. Once the boot kernel has been loaded, the boot kernel executes the boot loader (ST134). In one or more embodiments of the invention, the execution of the boot loader results in reconfiguration of the client to enable the client to use HTTP to download the ramdisk image.

Once the client has been reconfigured, the boot loader initiates downloading of the compress ramdisk image (ST136). In one or more embodiments of the invention, the boot loader uses a "wget" command to download the ramdisk image from the HTTP server. After the compressed ramdisk image has been downloaded, the compressed ramdisk image is uncompressed (ST138) and mounted onto the ramdisk currently in the memory of the client (ST140) using functionality provided by the boot loader. In one or more embodiments of the invention, the ramdisk is remounted in the memory of the client using the pivot_root command. At the conclusion of ST140, a full operating system has been loaded into the memory of the client and is ready for use.

In one or more embodiments of the invention, by virtue of its implementation, ramdisk technology for operating system deployment eliminates the need for and maintenance of server-based configuration (e.g., a set of identity files) and logging directories.

Figure 4:
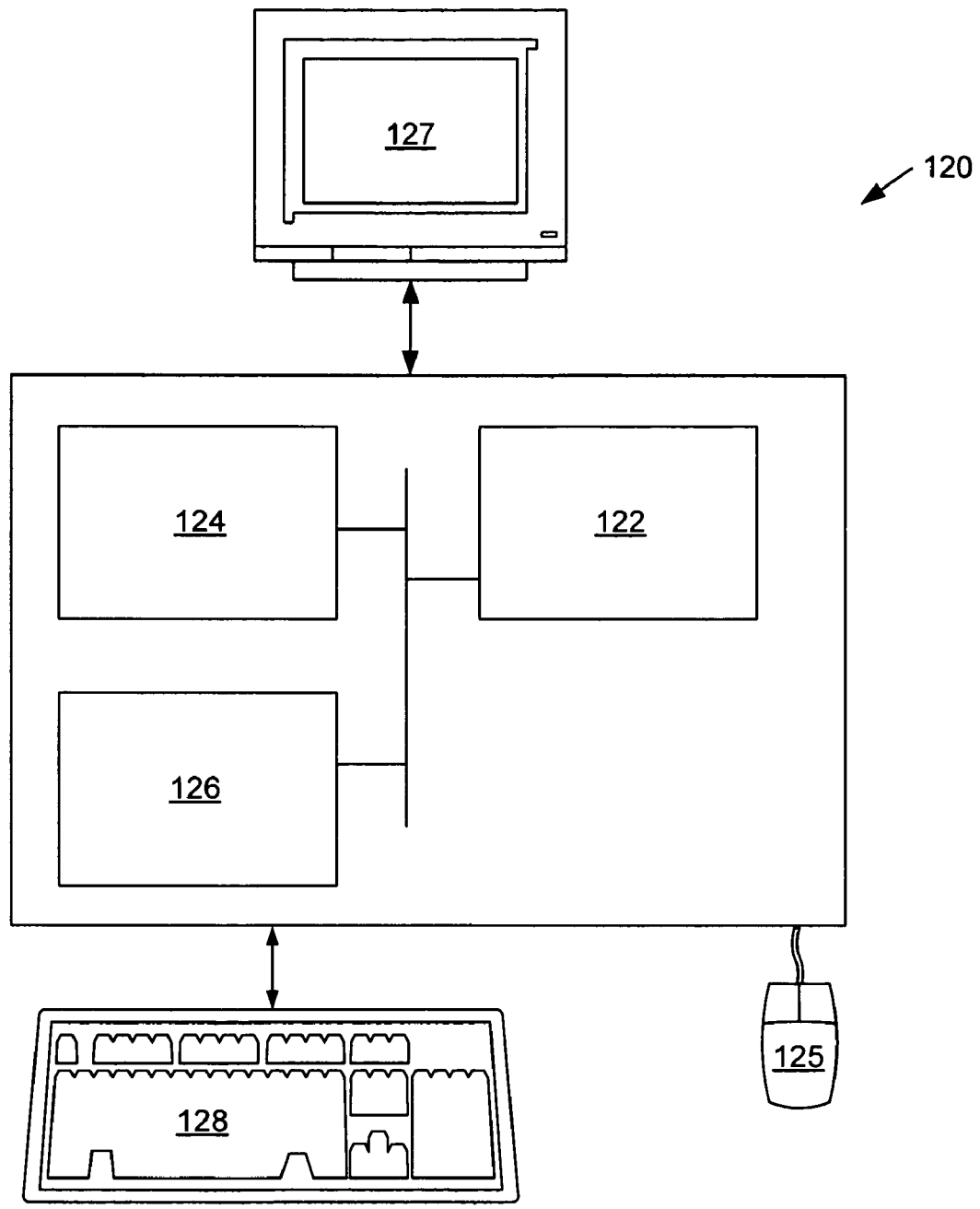
FIG. 4 shows a computer system in accordance with one or more embodiments of the invention.

The invention may be implemented on virtually any type of computer regardless of the platform being used. For example, as shown in FIG. 4, a computer system (120) includes a processor (124), associated memory (126), a storage device (122), and numerous other elements and functionalities typical of today's computers (not shown). The computer (120) may also include input means, such as a keyboard (128) and a mouse (125), and output means, such as a monitor (127). The computer system (120) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (120) may be located at a remote location and connected to the other elements over a network. Further, the invention may be implemented on a distributed system having a plurality of nodes. In one or more embodiments of the invention, the node corresponds to a computer system. Alternatively, the node may correspond to a processor with associated physical memory. The node may alternatively correspond to a processor with shared memory and/or resources. Further, software instructions to perform one or more embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for deploying an operating system on a client, comprising:
   downloading a boot configuration file;
   downloading a boot kernel and boot loader specified in the boot configuration file;
   booting the boot kernel on the client;
   executing the boot loader, by the kernel, to download a ramdisk image from at least one of a plurality of servers, wherein the boot configuration file is configured such that load between the at least one of a plurality of servers is approximately even during downloading of the ramdisk image; and
   mounting the ramdisk image in memory on the client, wherein the ramdisk image comprises the operating system,
   wherein the ramdisk image is downloaded using Hypertext Transfer Protocol (HTTP) and the boot configuration file is downloaded using Trivial File Transfer Protocol (TFTP).

2. The method of claim 1, further comprising:
   obtaining network boot parameters from a Dynamic Host Configuration Protocol (DHCP) server;
   downloading a boot file using the network boot parameters;
   executing the boot file to determine the boot configuration file; and
   searching for the boot configuration file, wherein the boot configuration file is associated with the client.

3. The method of claim 1, further comprising:
   creating a master image and an empty file;
   obtaining a snapshot of the master image;
   creating a filesystem on the empty file; and
   copying the snapshot into the filesystem to obtain the ramdisk image.

4. The method of claim 1, wherein the client is one of a plurality of clients in a grid computing system.

5. The method of claim 1, wherein the ramdisk image is greater than one gigabyte in size.

6. The method of claim 1, wherein the ramdisk image is downloaded from the one of the plurality of servers specified in the boot configuration file.

7. A system for deploying an operating system on a plurality of clients, comprising:
   a plurality of servers, wherein each of the plurality of servers comprises:
   a plurality of boot configuration files, wherein each of the plurality of boot configuration files is associated with one of the plurality of clients and configured such that load on each of the plurality of servers is approximately even during the downloading of the ramdisk image by the plurality of clients, and
   a ramdisk image; and
   the plurality of clients, wherein each of the plurality of clients comprises a memory, wherein each of the plurality of clients is configured to:
     search for the one of the plurality of boot configuration files associated with the client,
     download the one of the plurality of boot configuration files associated with the client,
     download the boot kernel and boot loader specified by the one of the plurality of boot configuration files associated with the client,
     boot the boot kernel on the client,
     execute the boot loader, by the kernel, to download of a ramdisk image, and
     mount the ramdisk image in memory on the client, wherein the ramdisk image comprises the operating system.

8. The system of claim 7, wherein each of the plurality of clients is further configured to:
   obtain network boot parameters from a Dynamic Host Configuration Protocol (DHCP) server;
   download a boot file using the network boot parameters; and
   execute the boot file to determine the one of the plurality of boot configuration files associated with the client.

9. The system of claim 7, wherein the ramdisk image is downloaded using Hypertext Transfer Protocol (HTTP) and the boot configuration file is downloaded using Trivial File Transfer Protocol (TFTP).

10. The system of claim 7, wherein the ramdisk image is greater than one gigabyte in size.

11. The system of claim 7, wherein the ramdisk image is downloaded from one of the plurality of servers specified in the boot configuration file associated with the one of the plurality of clients.

12. A computer readable medium containing instructions for deploying an operating system on a client, the instructions comprising functionality to:
   use Trivial File Transfer Protocol (TFTP) to download a boot configuration file;
   download a boot kernel and boot loader specified in the boot configuration file;
   boot the boot kernel on the client;
   execute the boot loader, by the kernel, to download a ramdisk image from at least one of a plurality of servers, wherein the boot configuration file is configured such that load between the at least one of a plurality of servers is approximately even during downloading of the ramdisk image, and wherein the ramdisk image is downloaded using Hypertext Transfer Protocol (HTTP); and
   mount the ramdisk image in memory on the client, wherein the ramdisk image comprises the operating system.

13. The computer readable medium of claim 12, further comprising instructions to:
   obtain network boot parameters from a Dynamic Host Configuration Protocol (DHCP) server;
   download a boot file using the network boot parameters;
   execute the boot file to determine the boot configuration file; and
   search for the boot configuration file, wherein the boot configuration file is associated with the client.

14. The computer readable medium of claim 12, further comprising instructions to:
   create a master image and an empty file;

obtain a snapshot of the master image;
create a filesystem on the empty file; and
copy the snapshot into the filesystem to obtain the ramdisk image.

15. The computer readable medium of claim 12, wherein the client is one of a plurality of clients in a grid computing system.

16. The computer readable medium of claim 12, wherein the ramdisk image is greater than one gigabyte in size.

17. The method of claim 12, wherein the ramdisk image is downloaded from the one of the plurality of servers specified in the boot configuration file.

* * * * *